United States Patent
Kim et al.

(10) Patent No.: US 8,654,836 B2
(45) Date of Patent: Feb. 18, 2014

(54) APPARATUS AND METHOD FOR DETERMINING ADAPTIVE FILTER TAP TO ENCODE WAVELET TRANSFORM COEFFICIENT, WAVELET TRANSFORM APPARATUS AND METHOD USING THE SAME, AND RECORDING MEDIUM FOR THE SAME

(75) Inventors: Hayoon Kim, Gyeonggi-do (KR); Yoonsik Choe, Gyeonggi-do (KR); Yonggoo Kim, Seoul (KR); Yungho Choi, Gyeonggi-do (KR); Sungjei Kim, Seoul (KR)

(73) Assignee: SK Telecom Co., Ltd., Jung-Gu, Seoul (KR)

( * ) Notice: Subject to any disclaimer, the term of this patent is extended or adjusted under 35 U.S.C. 154(b) by 358 days.

(21) Appl. No.: 13/055,683

(22) PCT Filed: Jul. 15, 2009

(86) PCT No.: PCT/KR2009/003888
§ 371 (c)(1),
(2), (4) Date: Apr. 14, 2011

(87) PCT Pub. No.: WO2010/011047
PCT Pub. Date: Jan. 28, 2010

(65) Prior Publication Data
US 2011/0182355 A1 Jul. 28, 2011

(30) Foreign Application Priority Data
Jul. 22, 2008 (KR) .................. 10-2008-0070976

(51) Int. Cl.
*H04N 7/32* (2006.01)
*G06K 9/36* (2006.01)

(52) U.S. Cl.
USPC ..................... 375/240.02; 382/232

(58) Field of Classification Search
USPC ........ 375/240.02–240.19, E07.125, E07.243; 382/232–248, 260–266, 305, 173; 345/419; 348/398.1
See application file for complete search history.

(56) References Cited

U.S. PATENT DOCUMENTS

| | | | |
|---|---|---|---|
| 2004/0062310 A1* | 4/2004 | Xue et al. | 375/240.16 |
| 2006/0088096 A1* | 4/2006 | Han et al. | 375/240.03 |

FOREIGN PATENT DOCUMENTS

KR  1020000041990  7/2000

OTHER PUBLICATIONS

International Search Report mailed Mar. 11, 2010 for PCT/KR2009/003888.
Bryan E. Usevitch, A Tutorial on Modern Lossy Wavelet Image Compression: Foundations of JPEG 2000, IEEE Signal Processing Magazine, Sep. 30, 2001, pp. 22-35.
Lin Ni, A Novel Image Retrieval Scheme in JPEG 2000 Compressed Domain Based on Tree Distance, ICICS-PCM, Dec. 18, 2003, pp. 1591-1594.

* cited by examiner

*Primary Examiner* — Dave Czekaj
*Assistant Examiner* — Dramos I Kalapodas
(74) *Attorney, Agent, or Firm* — Lowe Hauptman & Ham, LLP

(57) ABSTRACT

The present disclosure relates to an apparatus and method for determining an adaptive filter tap to encode a wavelet transform coefficient, a wavelet transform apparatus and a method using the same, and a recording medium for the same, wherein the filter tap is determined rendering the high-band energy to be minimized, based not only on whether an edge is present but also on the edge location so as to adaptively determine the filter tap for an efficient coding of the wavelet transform coefficient. Therefore, the disclosure is able to prevent ringing artifacts and increase coding efficiency while maintaining clear definition on the edges.

23 Claims, 8 Drawing Sheets

APPARATUS AND METHOD FOR DETERMINING ADAPTIVE FILTER TAP TO ENCODE WAVELET TRANSFORM COEFFICIENT, WAVELET TRANSFORM APPARATUS AND METHOD USING THE SAME, AND RECORDING MEDIUM FOR THE SAME

CROSS REFERENCE TO RELATED APPLICATION

This application claims the priority of Korean Patent Application No. 10-2008-0070976, filed on Jul. 22, 2008 in the KIPO (Korean Intellectual Property Office), the disclosure of which is incorporated herein in their entirety by reference. Further, this application is the National Phase application of International Application No. PCT/KR2009/003888, filed Jul. 15, 2009, which designates the United States and was published in Korean. Each of these applications is hereby incorporated by reference in their entirety into the present application.

TECHNICAL FIELD

The present disclosure relates to a video data compression technique. More particularly, the present disclosure relates to an apparatus and method for determining an adaptive filter tap for encoding a wavelet transform coefficient, a wavelet transform apparatus and a method using the same, and a recording medium for the same with an advanced coding efficiency of the wavelet transform-based video data compression technique.

BACKGROUND ART

The statements in this section merely provide background information related to the present disclosure and may not constitute prior art.

Generally, wavelet transform-based video data compression technique provides a solution to the blocking artifacts caused by conventional JPEG or MPEG-x, H.26L and other block-centered data processing methods, and is anticipated to be an excellent technique to provide scalability and progressive transmission adapting to the transmission and storage medium atmosphere as it is being applied to recent international standard JPEG2000 and Dirac, which is a video compression technique developed by British BBC.

Recent trends of discrete wavelet transform technique are directed in two ways: the first of which is towards using video signal's intrinsic characters of the directional components of its line, edge, and outline to improve the coding gain; and the second is to improve the coding gain by changing the filter tap following the edge of the video signal. Typical methods using the video signal directional component are next-generation discrete wavelet transform techniques such as Contourlet, Directionlet, and DADWT, which perform filtering along the image contour or edge directions and provide high vanishing moments, obtaining high coding gain.

Methods of varying filter taps along the video signal edge are implemented with [Reference 1] space-adaptive transform, [Reference 2] spatially adaptive wavelet video coding, and [Reference 3] MINT (Median based minimum variance interpolation). Such conventional standard wavelet transform techniques have provided high vanishing moments with respect to relatively uniform signals, although they have limitations of generating high wavelet coefficients against singularities such as edge or outline and there were methods suggested to handle the edge or outline problems by adaptively changing the filter taps in an effort to improve the coding gain.

[Reference 1] Roger L. Claypoole, Geoffrey M. Davis, Wim Sweldens, and Richard G. Baraniuk ("Nonlinear Wavelet Transforms for Image Coding via Lifting", IEEE Trans. Image Processing, vol. 12, no. 12, pp. 14491459, December 2003)

[Reference 2] Zhen Li, Feng Fu, Shipeng Li, and Edward Delp ("Wavelet Video Coding Via a Spatially Adaptive Lifting Structure", IEEE Int. Conf. on Acoustics, Speech, and Signal Processing, vol. 3, pp. 9396, 2003)

[Reference 3] Nikolaos V. Boulgouris, Dimitrios Tzvaras, Michael G. Strintzis ("Lossless Image Compression Based on Optimal Prediction, Adaptive Lifting, and Conditional Arithmetic Coding", IEEE Trans. Image Processing, vol. 10, no. 1, January 2001)

More specifically, [Reference 1] incorporates a 3×3 2-dimensional predicted window to find the edge location or starting point in the corresponding window. If there exists an edge, it is projected to truncated Fourier base to generate an edge model. Through the obtained edge model, the filter tap length of a prediction filter is determined as in FIG. 1. In FIG. 1 covering an inter-pixel interface B (so called to represent a steep pixel value change along a same row of pixels), dark circles are updated pixels $x_e[n]$ and bright circles are pixels to be predicted $x_o[n]$. The process of predicting the bright circles are comprised of their adjacent dark circles combined, and the number to a bright circle represent the number of dark circles used to predict the bright circle that equals to the filter tap length of the prediction filter. The [Reference 1] space-adaptive transform technique simply changes the filter tap depending on the existence of the edge without taking the edge shape or strength into account.

[Reference 3] adaptively selects filters by using a median hybrid filter which selects one with median residual signal among the optimal linear filters for reflecting local video characteristics.

Although the above described conventional methods have brought about improvements in the subjective image quality of mitigating the ringing artifacts and maintaining the edge sharpness through applying a long-tap filter to smooth areas of a video and a short-tap filter to the edge, they are recognized as having limitations in improving the images in the sense of objective quality. Because the wavelet generates smaller wavelet coefficients for a smooth video signal as the vanishing moment of the wavelet filter gets greater, the short-tap filters with a smaller vanishing moment is restricted to generate a relatively greater wavelet coefficient for the smooth video signal. In other words, using the short-tap filter in an insignificant gradient of the video signal edge or using an excessive number of the short-tap filters causes a limitation on the coding gain.

However, there are instances where the long-tap filter can predict signals better than the short-tap filter even at the presence of the edge. For example, let us assume there is an edge B between pixel x[2n+1] to be predicted at present and a left side pixel c[n] of the pixel x[2n+1] as shown in FIG. 2. c[n2], c[n1], c[n], c[n+1], and c[n+2] are pixels updated by using their adjacent pixels. In this event, since the described conventional methods determine the filter length depending on the presence of the edge, the short-tap filter would be selected and the prediction of c[n+2] is supposed to performed by using c[n]. In this event, because the prediction of x[2n+1] is done by using information across the edge, having little relevance to actual information to be predicted, the prediction accuracy becomes way too low, causing a large wavelet coefficient. Therefore, this situation may be better solved by using a long-tap filter rather than the short-tap filter to predict pixel x[2n+1] from appropriate pixels containing information similar to pixel x[2n+1]. However, those prior art methods relying uniformly on the presence or absence of the edge in determining the filter tap length entail the prediction inaccuracy and the low coding efficiency.

DISCLOSURE

Technical Problem

Therefore, the present disclosure has been made for an apparatus and a method for determining an adaptive filter tap in encoding a wavelet transform coefficient, a wavelet transform apparatus and a method using the same, and a recording medium for the same with the edge location considered as well as the presence of the edge for determining such a filter tap to minimize energy at a high band.

Technical Solution

One aspect of the present disclosure provides a wavelet transform apparatus including: a decomposer for decomposing an input signal into even polyphase pixels and odd polyphase pixels; an updater for updating the even polyphase pixels based on the odd polyphase pixels to obtain updated even polyphase pixels; an adaptive filter tap determiner for determining a filter tap from a same row of sequential pixel array based on a presence of an edge and a location of the edge, a determined filter tap rendering the high-band energy to be minimized; and a predictor for predicting the odd polyphase pixels based on the determined filter tap and the updated even polyphase pixels to obtain residual odd polyphase pixels.

The adaptive filter tap determiner includes: an edge presence checker for deciding whether an edge is present near odd pixels to be predicted, based on updated even pixels located near the odd pixels to be predicted; an edge location estimator for estimating the location of, if present, the edge to generate an estimated edge location; and a filter tap determiner for determining a filter tap for rendering the high-band energy to be minimized, based on whether the edge is present and the estimated edge location.

The filter tap determiner may elect a reference filter tap if the edge is absent, a long filter tap if the edge is present and located at a left side of the odd pixel to be predicted, and a short filter tap if the edge is present and not located at the left side of the odd pixel to be predicted.

Another aspect of the present disclosure provides a wavelet transform method including: decomposing an input signal into even polyphase pixels and odd polyphase pixels; updating the even polyphase pixels based on the odd polyphase pixels to obtain updated even polyphase pixels; determining a filter tap from a same row of sequential pixel array formed of the updated even polyphase pixels and the odd polyphase pixels, based on a presence of an edge and a location of the edge, a determined filter tap rendering the high-band energy to be minimized; and predicting the odd polyphase pixels based on the determined filter tap and the updated even polyphase pixels to obtain residual odd polyphase pixels.

The step of determining the filter tap may include: deciding whether an edge is present near odd pixels to be predicted, based on updated even pixels located near the odd pixels to be predicted; estimating the location of, if present, the edge to generate an estimated edge location; and determining a filter tap for rendering the high-band energy to be minimized, based on whether the edge is present and the estimated edge location.

The step of determining the filter tap may elect a reference filter tap if the edge is absent, a long filter tap if the edge is present and located at a left side of the odd pixel to be predicted, and a short filter tap if the edge is present and not located at the left side of the odd pixel to be predicted.

Yet another aspect of the present disclosure provides an adaptive filter tap determining apparatus for encoding wavelet transform coefficients including: an edge presence checker for deciding whether an edge is present near odd pixels to be predicted, from a same row of sequential pixel array formed of updated even polyphase pixels and odd polyphase pixels to be predicted, based on updated even pixels located near the odd pixels to be predicted; an edge location estimator for estimating the location of, if present, the edge to generate an estimated edge location; and a filter tap determiner for determining a filter tap for rendering the high-band energy to be minimized, based on whether the edge is present and the estimated edge location, the filter tap determiner electing a reference filter tap if the edge is absent, a long filter tap if the edge is present and located at a left side of the odd pixel to be predicted, and a short filter tap if the edge is present and not located at the left side of the odd pixel to be predicted.

Yet another aspect of the present disclosure provides an adaptive filter tap determining method for encoding wavelet transform coefficients including: deciding whether an edge is present near odd pixels to be predicted, from a same row of sequential pixel array formed of updated even polyphase pixels and odd polyphase pixels to be predicted, based on updated even pixels located near the odd pixels to be predicted; estimating the location of, if present, the edge to generate an estimated edge location; and determining a filter tap for rendering the high-band energy to be minimized, based on whether the edge is present and the estimated edge location, the step of determining the filter tap electing a reference filter tap if the edge is absent, a long filter tap if the edge is present and located at a left side of the odd pixel to be predicted, and a short filter tap if the edge is present and not located at the left side of the odd pixel to be predicted.

Yet another aspect of the present disclosure provides a computer readable storage medium having encoded thereon a program of a wavelet transform method executable by a computer, the method including: decomposing an input signal into even polyphase pixels and odd polyphase pixels; updating the even polyphase pixels based on the odd polyphase pixels to obtain updated even polyphase pixels; adaptively determining a filter tap from a same row of sequential pixel array formed of the updated even polyphase pixels and the odd polyphase pixels, based on a presence of an edge and a location of the edge, a determined filter tap rendering the high-band energy to be minimized; and predicting the odd polyphase pixels based on the determined filter tap and the updated even polyphase pixels to obtain residual odd polyphase pixels.

The step of adaptively determining the filter tap may include: deciding whether an edge is present near odd pixels to be predicted, based on updated even pixels located near the odd pixels to be predicted; estimating the location of, if present, the edge to generate an estimated edge location; and determining a filter tap for rendering the high-band energy to be minimized, based on whether the edge is present and the estimated edge location, the step of determining the filter tap electing a reference filter tap if the edge is absent, a long filter tap if the edge is present and located at a left side of the odd pixel to be predicted, and a short filter tap if the edge is present and not located at the left side of the odd pixel to be predicted.

Advantageous Effects

According to the disclosure as described above, the present disclosure adaptively determines the filter tap for an efficient coding of wavelet transform coefficients thereby provides a solution to the ringing artifacts and improves the coding efficiency while maintaining a clear definition on the edges.

MODE FOR INVENTION

Figure 1:
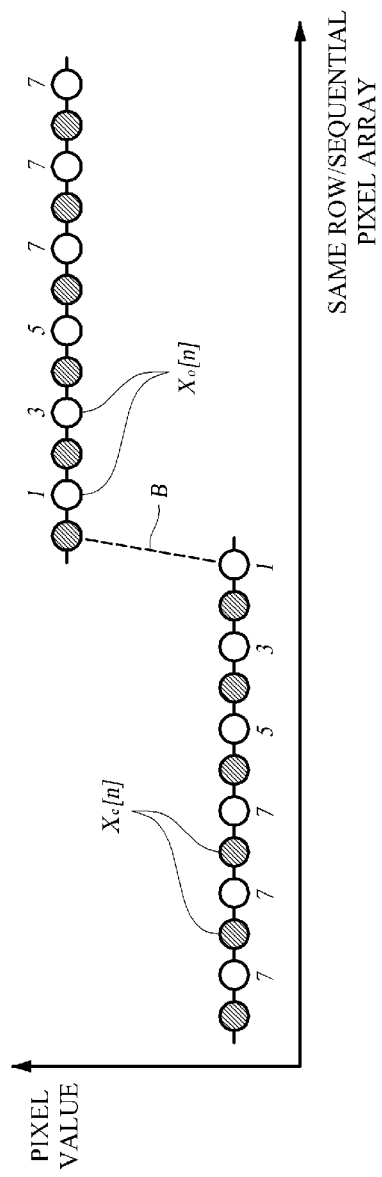
FIG. 1 is an exemplary diagram for showing a conventional method for determining a prediction filter tap.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 3:
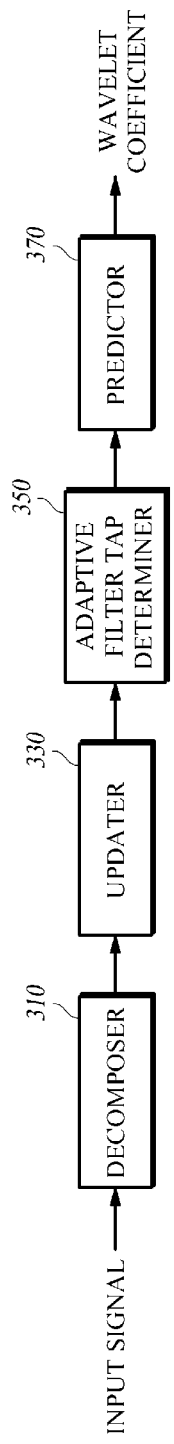
FIG. 3 is a block diagram for showing a wavelet transform apparatus using an adaptive filter tap determination according to an aspect.

Referring to a block diagram of FIG. 3 for showing a wavelet transform apparatus using an adaptive filter tap determination according to an aspect of the embodiment, the wavelet transform apparatus includes a decomposer 310, an updater 330, an adaptive filter tap determiner 350, and a predictor 370.

Decomposer 310 decomposes an inputted video signal into even polyphase pixels and odd polyphase pixels.

Updater 330 obtains updated even polyphase pixels by updating the even polyphase pixels based on the odd polyphase pixels. In other words, updater 330 predicts the even polyphase pixels from the odd polyphase pixels to obtain predicted values and adds the predicted values to the even polyphase pixels to generate the updated even polyphase pixels.

Adaptive filter tap determiner 350 determines a filter tap that minimizes the high-band energy from a same row of sequential pixel array inputted from updater 330, based on whether an edge is present and on the location of the edge. Checking for the edge presence and estimating the edge location will be described in detail next with reference to FIG. 4.

Predictor 370 predicts the odd polyphase pixels based on the determined filter tap and the updated even polyphase pixels to obtain residual odd polyphase pixels. Specifically, predictor 370 uses a filter out of the determined filter tap, for example, one of reference tap filters, long tap filters, and short tap filters to perform a prediction of the odd polyphase pixels from the updated even polyphase pixels, and subtracts a prediction value obtained by using the prediction from the odd polyphase pixels to produce the residual odd polyphase pixels.

When a specific form of filter in the described update and prediction is used, the updated even polyphase pixels become low-band-filtered wavelet coefficients and the predicted odd polyphase sample (residual odd polyphase sample) becomes a high-band-filtered wavelet coefficient.

Figure 4:
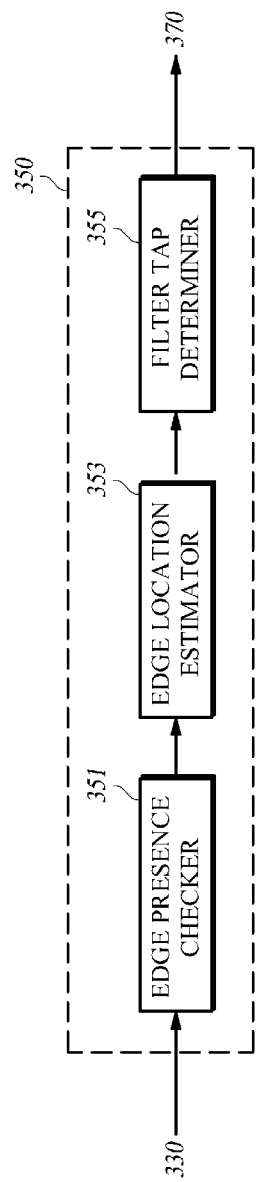
FIG. 4 is a detailed diagram for showing an adaptive filter tap determiner of FIG. 3 and a block diagram of an adaptive filter tap determining apparatus for encoding wavelet transform coefficients according to an aspect.

FIG. 4 is a detailed diagram for showing adaptive filter tap determiner 350 of FIG. 3 and a block diagram of an adaptive filter tap determining apparatus for encoding wavelet transform coefficients according to an aspect.

Adaptive filter tap determining apparatus 350 for encoding wavelet transform coefficients includes an edge presence checker 351, an edge location estimator 353, and a filter tap determiner 355 as shown in FIG. 4.

Figure 2:
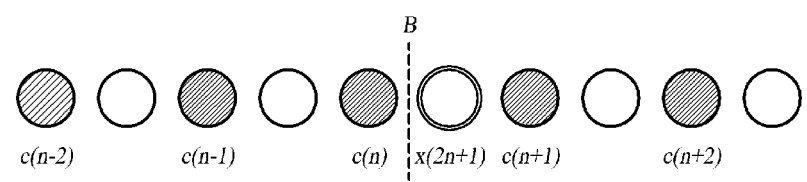
FIG. 2 is a diagram for showing indexing of updated pixels and pixels to predict from a same row of sequential pixel array.

Edge presence checker 351 decides whether an edge is present near the odd pixels to be predicted, based on correlations of the updated even pixels located near the odd pixels to be predicted. For example, if the odd pixels to be predicted in FIG. 2 is x(2n+1), the necessary updated even pixels to predict the same x(2n+1) are . . . , c(n2), c(n1), c(n), c(n+1), c(n+2), . . . where checking whether the edge is present may be performed by using Equation 1.

$$\text{Equation 1}$$
$$\text{if } \{\text{abs}(c(n-1) - c(n)) > TH \| \text{abs}(c(n) - c(n+1)) > TH\}$$
$$\quad \text{edges}$$
$$\text{else}$$
$$\quad \text{no edge}$$

In other words, edge presence checker 351 decides whether the edge is present depending on whether Equation 1 is satisfied, in which event the edge is determined to be present, and otherwise the edge is determined not to be absent. In Equation 1, $c(n-1)$, $c(n)$, and $c(n+1)$ represent pixel values of the updated even pixels; n represents locations of the updated even pixels, n and n+1 being the first locations to left side and right side of and adjacent to the odd pixels to be predicted, respectively; and TH is a preset reference value that is empirically determined. In addition, abs in Equation 1 represents an absolute value, and symbol '$\|$' represents logical sum, i.e. 'OR'.

When edge presence checker 351 decides for the presence of the edge, edge location estimator 353 estimates the location of the edge. For example, estimating the edge location in FIG. 2 may be done by using Equation 2. If Equation 2 is satisfied in FIG. 2, it is estimated that the edge is located at the left side of the odd pixel to be predicted x(2n+1).

$$\text{Equation 2}$$
$$\text{if } \{c(n-1) > c(n) > c(n+1) \| c(n+1) > c(n) > c(n-1)\}$$
$$\quad \text{edge on left of } x(2n+1)$$
$$\text{else}$$
$$\quad \text{edge elsewhere}$$

In Equation 2, c(n−1), c(n), and c(n+1) represent pixel values of the updated even pixels; n represents locations of the updated even pixels, n and n+1 being the first locations to left side and right side of and adjacent to the odd pixels to be predicted, respectively. In addition, abs in Equation 1 represents an absolute value, and symbol '||' represents logical sum, i.e. 'OR'.

Filter tap determiner 355 determines a filter tap for rendering the high-band energy to be minimized, based on the decision whether the edge is present at edge presence checker 351 and on the estimated edge location at edge location estimator 353. That is, filter tap determiner 355 elects a reference filter tap if the edge is absent, a long filter tap if the edge is present and located at a left side of the odd pixel to be predicted, and a short filter tap if the edge is present and not located at the left side of the odd pixel to be predicted.

Figure 5:
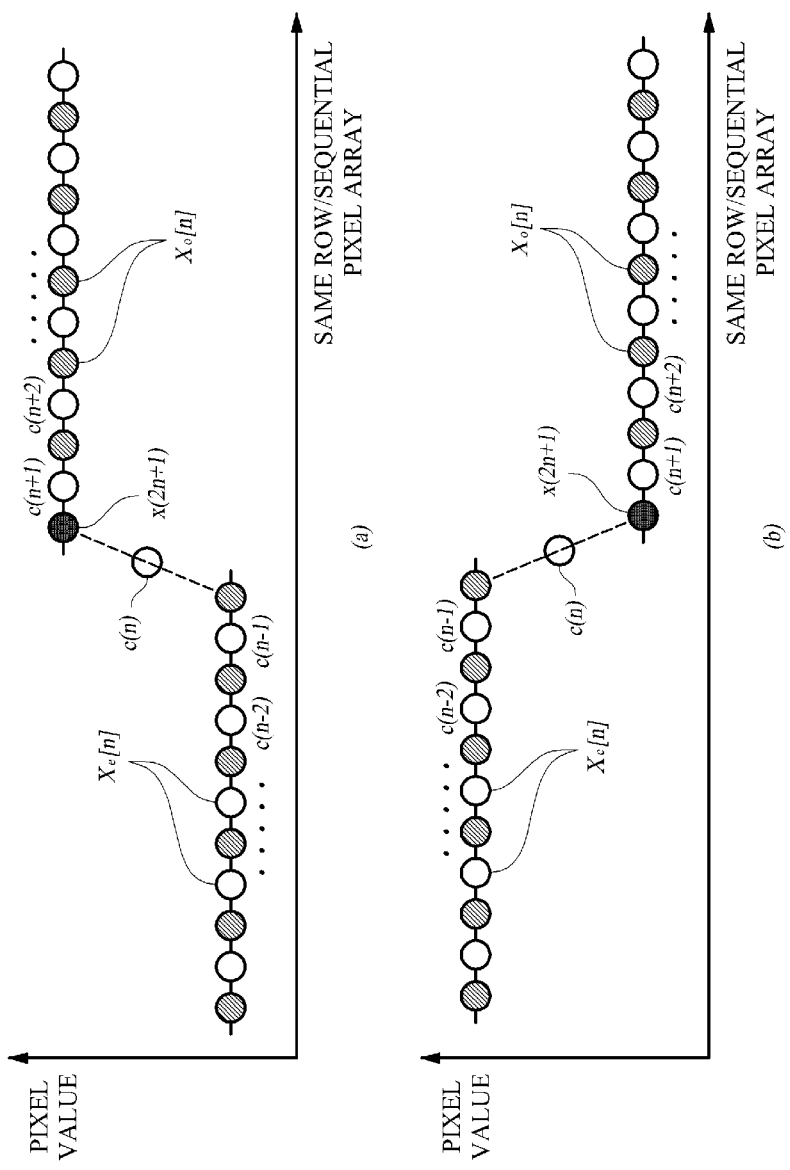
FIGS. 5 and 6 are exemplary diagrams for showing various locations of an edge.

FIG. 5 presents exemplary diagrams of Equation 2 being satisfied at (a) and (b). That is, FIG. 5 (a) is for the event that c(n+1))>c(n)>c(n−1) is satisfied and FIG. 5 (b) is when c(n−1)>c(n)>c(n+1) is true in which case it is estimated that the edge is located at the left side of the odd pixel to be predicted that is x(2n+1).

Figure 6:
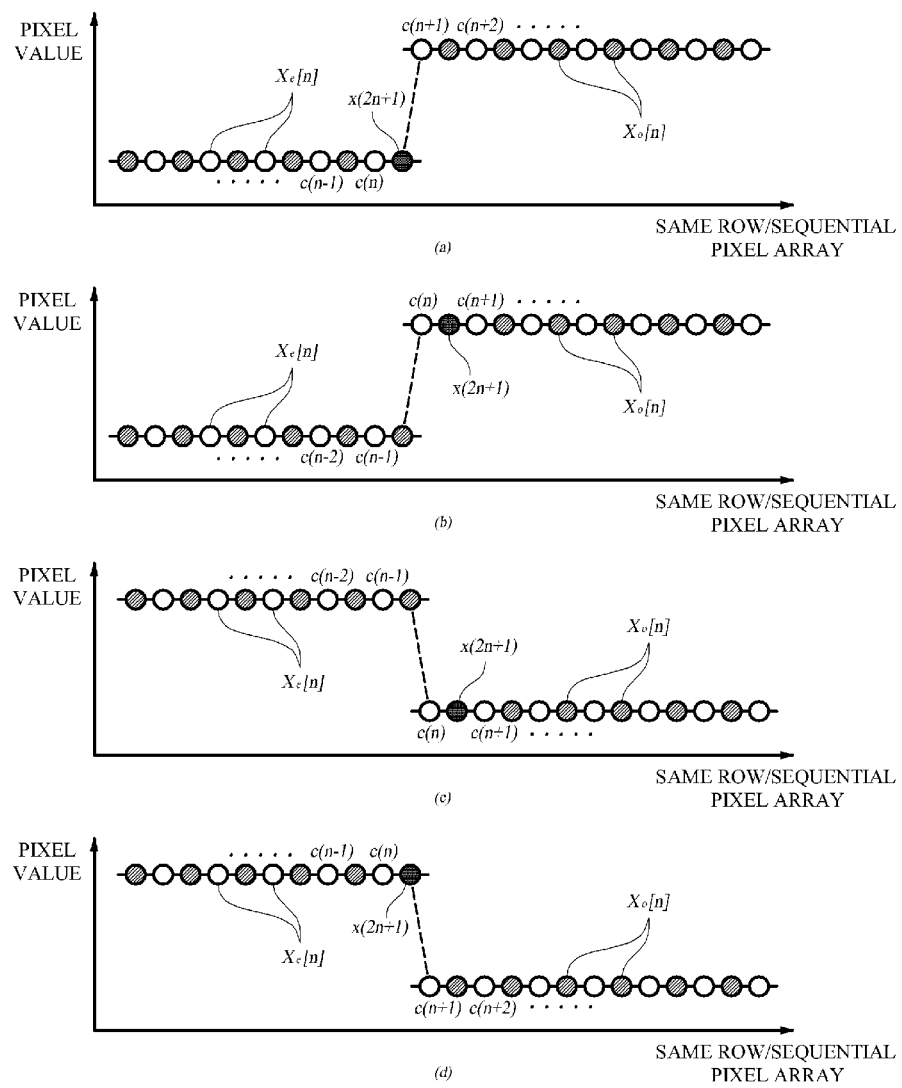

In contrast, FIG. 6 presents exemplary diagrams of when Equation 2 is not satisfied. That is, FIG. 6 (a) is of the event that c(n+1))>c(n)=c(n−1) and the edge is located at the right side of the odd pixel to be predicted x(2n+1). FIG. 6 (b) is of the event when c(n+1))=c(n)>c(n−1), and the edge appears to be located at the left side of the odd pixel to be predicted x(2n+1) but practically it is located at the left side of c(n). FIG. 6 (c) is of the event when c(n−1)>c(n)=c(n+1), and the edges is located at the left side of c(n). FIG. 6 (d) is of the event of c(n−1)=c(n)>c(n+1), and the edge is located at the right side of the odd pixel to be predicted x(2n+1).

Figure 7:
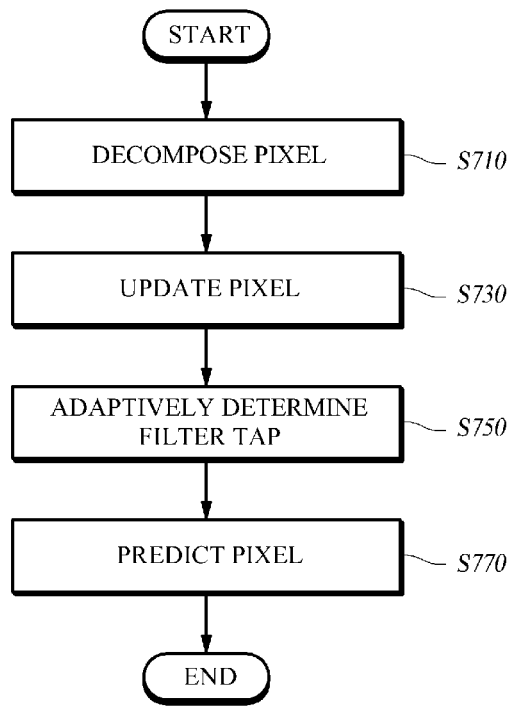
FIG. 7 is a flow diagram for illustrating a wavelet transform method using an adaptive filter tap determination according to an aspect.

FIG. 7 is a flow diagram for illustrating a wavelet transform method using an adaptive filter tap determination according to an aspect and will be applied to FIG. 3 for description.

First, an input video signal is decomposed at decomposer 310 into even polyphase pixels and odd polyphase pixels at step S710.

Next, the even polyphase pixels are updated by updater 330 based on the odd polyphase pixels to obtain updated even polyphase pixels. Specifically, predicting the even polyphase pixels from the odd polyphase pixels gives the predicted values and adding the predicted values to the even polyphase pixels generates the updated even polyphase pixels at step S730.

Then, adaptive filter tap determiner 350 determines a filter tap from a same row of sequential pixel array formed of the updated even polyphase pixels and the odd polyphase pixels, based on whether an edge is present and a location of the edge at step S750, wherein the determined filter tap renders the high-band energy to be minimized. This step of adaptively determining the filter tap at S750 will be described in detail referring to FIG. 8.

Lastly, by predictor 370, predicting is performed with respect to the odd polyphase pixels based on the determined filter tap and the updated even polyphase pixels to obtain residual odd polyphase pixels. Specifically, predictor 370 uses a filter out of the determined filter taps, for example, one of the reference tap filter, long tap filter, and short tap filter to perform the prediction of the odd polyphase pixels from the updated even polyphase pixels, and subtracts the resultant prediction value from the odd polyphase pixels to produce the residual odd polyphase pixels at step S770.

Figure 8:
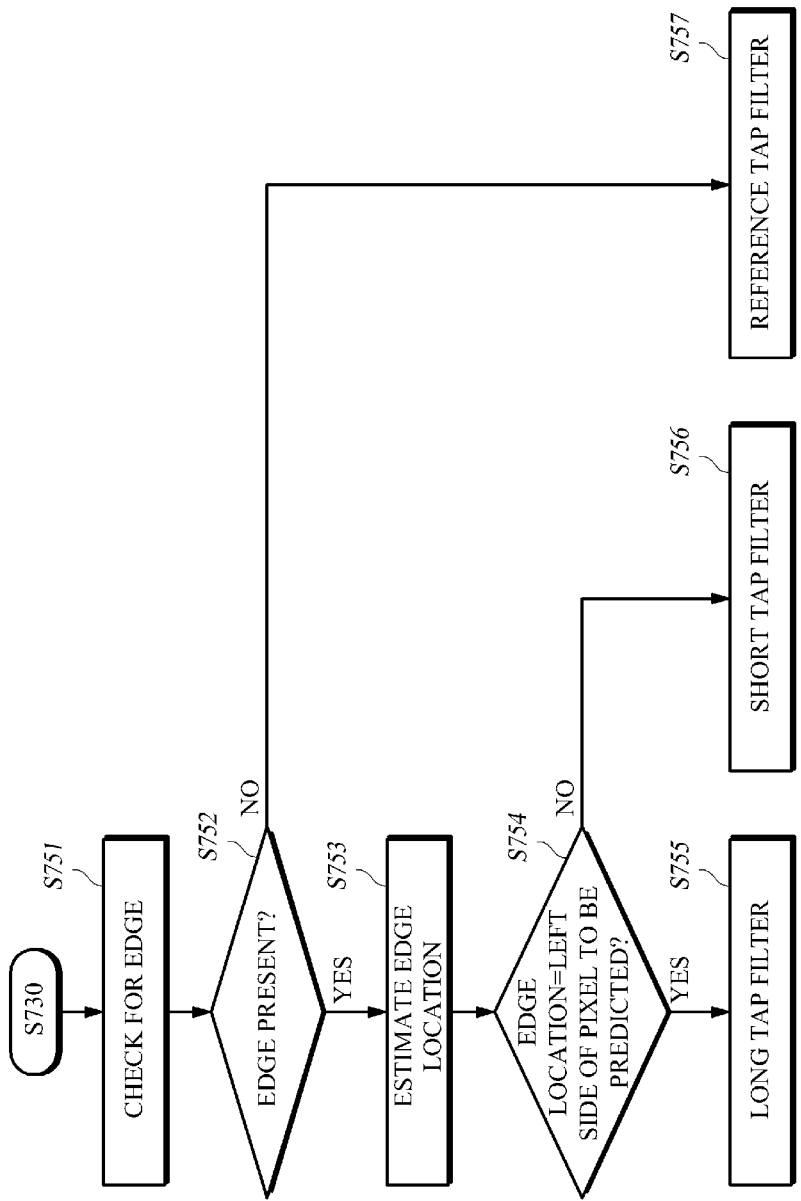
FIG. 8 is a detailed flow diagram for showing the adaptive filter tap determining step of FIG. 7 and a flow diagram of an adaptive filter tap determining method for encoding wavelet transform coefficients according to an aspect.

FIG. 8 is a detailed flow diagram for showing the adaptive filter tap determining step in S750 of FIG. 7 and a flow diagram of an adaptive filter tap determining method for encoding wavelet transform coefficients according to an aspect. The description will be made to the adaptive filter tap determining apparatus of FIG. 4.

First, adaptive filter tap determiner 350 receives an input of a same row of sequential pixel array composed of updated even polyphase pixels and odd polyphase pixels to be predicted, and decides whether an edge is present near the odd pixels to be predicted, based on the correlations of the updated even pixels located near the odd pixels to be predicted, wherein such question of whether the edge is present is answered depending on whether Equation 1 is satisfied (S751-S752).

Next, if the edge is present, edge location estimator 353 estimates the location of the edge, where in the event that Equation 2 is satisfied, the edge location is estimated to be at a left side of the odd pixels to be predicted, and otherwise, the edge is estimated to be at any other locations than the left side of the odd pixels to be predicted (S753-S754).

Lastly, filter tap determiner 355 determines a filter tap for rendering the high-band energy to be minimized, based on whether the edge is present and the estimated edge location. In particular, filter tap determiner 355 elects the long filter tap if the edge is present and located at the left side of the odd pixel to be predicted (S755), the short filter tap if the edge is present and not located at the left side of the odd pixel to be predicted (S756), and the reference filter tap if the edge is absent (S757).

The wavelet transform method using the adaptive filter tap determination according to an aspect described with reference to FIGS. 7 and 8 may be implemented in the form of a computer-readable code on a computer-readable recording medium. The computer-readable recording medium includes all types of recording devices in which data readable by a computer is stored and may include, for example, ROM, RAM, CD-ROM, magnetic tapes, floppy disks, and optical data storage devices.

The recording medium further includes the cases that are implemented in the form of carrier waves (for example, in the case of transmission over the Internet). It is possible to store and execute the code that can be distributed among computer systems connected via a network and can be read by computers in a distributed manner.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

According to the disclosure as described above, when applied to the wavelet transform-based video compression technologies, the present disclosure adaptively determines the filter tap for the efficient coding of the wavelet transform coefficients, whereby resolving the ringing artifacts and increasing the coding efficiency while maintaining a clear definition on the edges.

The invention claimed is:

1. A wavelet transform apparatus, comprising:
   a decomposer configured to decompose an input signal into even polyphase pixels and odd polyphase pixels;
   an updater configured to obtain updated even polyphase pixels by updating the even polyphase pixels based on the odd polyphase pixels;
   an adaptive filter tap determiner configured to determine the number of filter taps rendering a high-band energy to be minimized, from a sequential pixel array including the updated even polyphase pixels and the odd polyphase pixels, based on a presence of an edge of an odd polyphase pixel to be predicted and a location of the edge of the odd polyphase pixel to be predicted; and a predictor configured to obtain residual odd polyphase pixels by predicting the odd polyphase pixels based on the determined filter tap and the updated even polyphase pixels.

2. The wavelet transform apparatus of claim 1, wherein the adaptive filter tap determiner comprises:

an edge presence checker configured to decide whether the edge of the odd polyphase pixel to be predicted is present near the odd polyphase pixel to be predicted, based on the updated even polyphase pixels located near the odd polyphase pixel to be predicted;

an edge location estimator configured to estimate the location of the edge, if present, to generate an estimated edge location; and a filter tap determiner configured to determine the number of filter taps for rendering the high-band energy to be minimized, based on whether the edge is present and the estimated edge location.

3. The wavelet transform apparatus of claim 2, wherein the edge presence checker is further configured to determine whether the edge is present depending on whether the following relationship is satisfied:

$$\text{abs}(c(n-1)-c(n))>TH \text{ or } \text{abs}(c(n)-c(n+1))>TH$$

wherein $c(n-1)$, $c(n)$, and $c(n+1)$ represent pixel values of the updated even polyphase pixels;

n represents locations of the updated even polyphase pixels, n and n+1 are first locations to the left side and right side of, and adjacent to, the odd polyphase pixel to be predicted, respectively; and TH is a preset reference value.

4. The wavelet transform apparatus of claim 2, wherein the edge location estimator is further configured to estimate that the edge is located at the left side of the odd polyphase pixel to be predicted, depending on whether the following relationship is satisfied:

$$c(n-1)>c(n)>c(n+1) \text{ or } c(n+1)>c(n)>c(n-1)$$

wherein $c(n-1)$, $c(n)$, and $c(n+1)$ represent pixel values of the updated even polyphase pixels;

n represents locations of the updated even polyphase pixels, n and n+1 being first locations to the left side and right side of, and adjacent to, the odd polyphase pixel to be predicted, respectively.

5. The wavelet transform apparatus of claim 2, wherein the filter tap determiner is further configured to elect a reference filter tap if the edge is absent, a long filter tap if the edge is present and located at a left side of the odd polyphase pixel to be predicted, and a short filter tap if the edge is present and not located at the left side of the odd polyphase pixel to be predicted.

6. A wavelet transform method, the method performed by a wavelet transform apparatus and comprising:

decomposing an input signal into even polyphase pixels and odd polyphase pixels;

obtaining updated even polyphase pixels by updating the even polyphase pixels based on the odd polyphase pixels;

determining the number of filter taps rendering a high-band energy to be minimized, from a sequential pixel array including the updated even polyphase pixels and the odd polyphase pixels, based on a presence of an edge of odd polyphase pixel to be predicted and a location of the edge of the odd polyphase pixel to be predicted; and obtaining residual odd polyphase pixels by predicting the odd polyphase pixels based on the determined filter tap and the updated even polyphase pixels.

7. The wavelet transform method of claim 6, wherein the determining comprises:

deciding whether the edge of the odd polyphase pixel to be predicted is present near the odd polyphase pixel to be predicted, based on the updated even polyphase pixels located near the odd polyphase pixel to be predicted;

estimating the location of the edge, if present, to generate an estimated edge location; and determining the number of filter taps for rendering the high-band energy to be minimized, based on whether the edge is present and the estimated edge location.

8. The wavelet transform method of claim 7, wherein the deciding comprises determining whether the edge is present depending on whether the following relationship is satisfied:

$$\text{abs}(c(n-1)-c(n))>TH \text{ or } \text{abs}(c(n)-c(n+1))>TH$$

wherein $c(n-1)$, $c(n)$, and $c(n+1)$ represent pixel values of the updated even polyphase pixels;

n represents locations of the updated even polyphase pixels, n and n+1 are first locations to the left side and right side of, and adjacent to, the odd polyphase pixel to be predicted, respectively; and TH is a preset reference value.

9. The wavelet transform method of claim 7, wherein the estimating comprises estimating that the edge is located at the left side of the odd polyphase pixel to be predicted, depending on whether the following relationship is satisfied:

$$c(n-1)>c(n)>c(n+1) \text{ or } c(n+1)>c(n)>c(n-1)$$

wherein $c(n-1)$, $c(n)$, and $c(n+1)$ represent pixel values of the updated even polyphase pixels;

n represents locations of the updated even polyphase pixels, n and n+1 are first locations to the left side and right side of, and adjacent to, the odd polyphase pixel to be predicted, respectively.

10. The wavelet transform method of claim 7, wherein the determining comprises electing a reference filter tap if the edge is absent, a long filter tap if the edge is present and located at a left side of the odd polyphase pixel to be predicted, and a short filter tap if the edge is present and not located at the left side of the odd polyphase pixel to be predicted.

11. An adaptive filter tap determining apparatus for encoding wavelet transform coefficients, the apparatus comprising:

an edge presence checker configured to decide whether an edge of an odd polyphase pixel to be predicted is present near the odd polyphase pixel to be predicted, from a sequential pixel array including updated even polyphase pixels and odd polyphase pixel to be predicted, based on the updated even polyphase pixels located near the odd polyphase pixel to be predicted;

an edge location estimator configured to estimate the location of the edge of the odd polyphase pixel to be predicted, if present, to generate an estimated edge location; and a filter tap determiner configured to determine the number of filter taps for rendering a high-band energy to be minimized, based on whether the edge is present and the estimated edge location.

12. The adaptive filter tap determining apparatus of claim 11, wherein the edge presence checker is further configured to determine whether the edge is present depending on whether the following relationship is satisfied:

$$\text{abs}(c(n-1)-c(n))>TH \text{ or } \text{abs}(c(n)-c(n+1))>TH$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively; and TH is a preset reference value.

13. The adaptive filter tap determining apparatus of claim 11, wherein the edge location estimator is further configured to estimate that the edge is located at the left side of the odd polyphase pixel to be predicted, depending on whether the following relationship is satisfied:

$$c(n-1)>c(n)>c(n+1) \text{ or } c(n+1)>c(n)>c(n-1)$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively.

14. The adaptive filter tap determining apparatus of claim 11, wherein the filter tap determiner is further configured to elect a reference filter tap if the edge is absent, a long filter tap if the edge is present and located at a left side of the odd polyphase pixel to be predicted, and a short filter tap if the edge is present and not located at the left side of the odd polyphase pixel to be predicted.

15. An adaptive filter tap determining method for encoding wavelet transform coefficients, the method performed by an adaptive filter tap determining apparatus and comprising:

deciding whether an edge of an odd polyphase pixel to be predicted is present near the odd polyphase pixel to be predicted, from a sequential pixel array including updated even polyphase pixels and odd polyphase pixel to be predicted, based on the updated even polyphase pixels located near the odd polyphase pixel to be predicted;

estimating the location of the edge of the off polyphase pixel to be predicted, if present, to generate an estimated edge location; and determining the number of filter taps for rendering a high-band energy to be minimized, based on whether the edge is present and the estimated edge location.

16. The adaptive filter tap determining method of claim 15, wherein the deciding comprises determining whether the edge is present depending on whether the following relationship is satisfied:

$$\text{abs}(c(n-1)-c(n))>TH \text{ or } \text{abs}(c(n)-c(n+1))>TH$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively; and TH is a preset reference value.

17. The adaptive filter tap determining method of claim 15, wherein the estimating comprises estimating that the edge is located at the left side of the odd polyphase pixel to be predicted, depending on whether the following relationship is satisfied:

$$c(n-1)>c(n)>c(n+1) \text{ or } c(n+1)>c(n)>c(n-1)$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively.

18. The adaptive filter tap determining method of claim 15, wherein the determining comprises electing a reference filter tap if the edge is absent, a long filter tap if the edge is present and located at a left side of the odd polyphase pixel to be predicted, and a short filter tap if the edge is present and not located at the left side of the odd polyphase pixel to be predicted.

19. A non-transitory computer readable storage medium having encoded thereon a program of a wavelet transform method executable by a computer, the method comprising:

decomposing an input signal into even polyphase pixels and odd polyphase pixels;

obtaining updated even polyphase pixels by updating the even polyphase pixels based on the odd polyphase pixels;

adaptively determining the number of filter taps rendering a high-band energy to be minimized from a sequential pixel array including the updated even polyphase pixels and the odd polyphase pixels, based on a presence of an edge of odd pixel to be predicted and a location of the edge of the odd polyphase pixel to be predicted; and obtaining residual odd polyphase pixels by predicting the odd polyphase pixels based on the determined filter tap and the updated even polyphase pixels.

20. The non-transitory computer readable storage medium of claim 19, wherein the determining comprises:

deciding whether the edge of the odd polyphase pixel to be predicted is present near the odd polyphase pixel to be predicted, based on the updated even polyphase pixels located near the odd polyphase pixel to be predicted;

estimating the location of the edge, if present, to generate an estimated edge location; and determining the number of filter taps for rendering the high-band energy to be minimized, based on whether the edge is present and the estimated edge location.

21. The non-transitory computer readable storage medium of claim 20, wherein the deciding comprises determining whether the edge is present depending on whether the following relationship is satisfied:

$$\text{abs}(c(n-1)-c(n))>TH \text{ or } \text{abs}(c(n)-c(n+1))>TH$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively; and TH is a preset reference value.

22. The non-transitory computer readable storage medium of claim 20, wherein the estimating comprises estimating that the edge is located at the left side of the odd polyphase pixel to be predicted, depending on whether the following relationship is satisfied:

$$c(n-1)>c(n)>c(n+1) \text{ or } c(n+1)>c(n)>c(n-1)$$

wherein $c(n-1)$, $c(n)$, and $c(n+1)$ represent pixel values of the updated even polyphase pixels;

n represents locations of the updated even polyphase pixels, n and n+1 being first locations to left side and right side of, and adjacent to, the odd polyphase pixel to be predicted, respectively.

23. The non-transitory computer readable storage medium of claim 20, wherein the step of determining comprises electing a reference filter tap if the edge is absent, a long filter tap if the edge is present and located at a left side of the odd polyphase pixel to be predicted, and a short filter tap if the edge is present and not located at the left side of the odd polyphase pixel to be predicted.

* * * * *